US008649791B1

(12) United States Patent
Wohld (10) Patent No.: US 8,649,791 B1
(45) Date of Patent: Feb. 11, 2014

(54) AUTOMATIC NEIGHBOR LIST GENERATION FOR LONG-TERM EVOLUTION (LTE)

(75) Inventor: Adam Harold Wohld, Saint Charles, IL (US)

(73) Assignee: Cellco Partnership, Basking Ridge, NJ (US)

( * ) Notice: Subject to any disclaimer, the term of this patent is extended or adjusted under 35 U.S.C. 154(b) by 190 days.

(21) Appl. No.: 13/167,515

(22) Filed: Jun. 23, 2011

(51) Int. Cl.
*H04W 40/00* (2009.01)

(52) U.S. Cl.
USPC ............ 455/446; 455/447; 455/448; 455/449

(58) Field of Classification Search
USPC ................ 455/434–449, 426.1, 127.4, 552.1; 370/331–334
See application file for complete search history.

(56) References Cited

U.S. PATENT DOCUMENTS

| | | | | |
|---|---|---|---|---|
| 5,680,557 A * | 10/1997 | Karamchetty | ................. | 715/866 |
| 5,724,665 A * | 3/1998 | Abbasi et al. | .................. | 455/561 |
| 5,794,149 A * | 8/1998 | Hoo | ............................... | 455/438 |
| 5,826,189 A * | 10/1998 | Thapa et al. | ................... | 455/428 |
| 6,150,987 A * | 11/2000 | Sole et al. | ...................... | 343/757 |
| 6,778,833 B1 * | 8/2004 | Fortuna | .......................... | 455/446 |
| 7,330,727 B2 * | 2/2008 | Korneluk et al. | ............. | 455/438 |
| 7,379,740 B2 * | 5/2008 | Da Torre et al. | ............... | 455/446 |
| 8,290,508 B2 * | 10/2012 | Medapalli et al. | ......... | 455/456.1 |
| 2003/0050079 A1 * | 3/2003 | Tsunehara et al. | ............ | 455/456 |
| 2007/0184836 A1 * | 8/2007 | He | ............................... | 455/434 |
| 2007/0291770 A1 | 12/2007 | Kitazoe | | |
| 2008/0108353 A1 | 5/2008 | Lee et al. | | |
| 2008/0188244 A1 * | 8/2008 | Mazlum et al. | ............ | 455/456.6 |
| 2008/0268878 A1 | 10/2008 | Wang et al. | | |
| 2009/0047958 A1 | 2/2009 | Rimhagen et al. | | |
| 2009/0059867 A1 * | 3/2009 | Rajasimman et al. | ........ | 370/332 |
| 2010/0081436 A1 * | 4/2010 | Kubo et al. | ................ | 455/435.1 |
| 2010/0136969 A1 | 6/2010 | Nader et al. | | |
| 2010/0150112 A1 * | 6/2010 | Lee et al. | ........................ | 370/332 |
| 2010/0173633 A1 * | 7/2010 | Catovic et al. | ................ | 455/436 |
| 2010/0177758 A1 * | 7/2010 | Aqvist et al. | ................... | 370/342 |
| 2010/0234010 A1 | 9/2010 | Fischer | | |
| 2010/0323699 A1 * | 12/2010 | Hashimoto | .................... | 455/436 |
| 2011/0098070 A1 * | 4/2011 | Han et al. | ....................... | 455/507 |
| 2011/0319086 A1 * | 12/2011 | Katori | ............................ | 455/440 |
| 2012/0129567 A1 * | 5/2012 | Kimura et al. | ................ | 455/522 |
| 2012/0149394 A1 * | 6/2012 | Singh et al. | ................. | 455/456.1 |
| 2012/0276899 A1 * | 11/2012 | Kolding et al. | ............. | 455/435.1 |

OTHER PUBLICATIONS

Amirijoo, M., et al., "Neighbor Cell Relation List and Physical Cell Identity Self-Organization in LTE".

\* cited by examiner

*Primary Examiner* — Dominic E Rego (57) ABSTRACT

A list of neighbor cells for a base station of a Long-Term Evolution mobile communication network is developed based on distance information of neighboring cells. Location data identifying location of the base station for which the list of neighbor cells is to be developed and locations of other base stations are processed to determine distance between the base station and each respective one of the other base stations. Based on at least in part determined distances, identification data of the other base stations are ordered. The list of neighbor cells for the base station is compiled to include the ordered identification data for a selected number of nearest ones of the other base stations, based on at least in part the determined distances.

19 Claims, 10 Drawing Sheets

Remove Same PNs as eNB X
(* eNB doesn't need neighbor to self and can't handoff to same channel)

Results
309 { eNB X, PN 1, 0 Mile
eNB E, PN 4, 1 Mile
eNb B, PN 2, 2 Miles
eNB D, PN 3, 2.3 Miles
eNB C, PN 2, 2.5 Miles
eNB F, PN 1, 2.6 Miles

*Note eNB A not included in search results since it's outside of search radius Results
eNB E, PN 4, 1 Mile
eNB B, PN 2, 2 Miles } 313
eNB D, PN 3, 2.3 Miles
eNB C, PN 2, 2.5 Miles

*Note eNB A not included in search results since it's outside of search radius

FIG. 4C

Remove Duplicate PNs
(* eNB doesn't need neighbor to self and can't handoff to same channel)

313 {
Results
eNB E, PN 4, 1 Mile
eNB B, PN 2, 2 Miles
eNB D, PN 3, 2.3 Miles
eNB C, PN 2, 2.5 Miles If R2 > R1,
keep R1 and discard all others Remove any
duplicate PNs, keep
the first closest

Results
eNB E, PN 4, 1 Mile
eNB B, PN 2, 2 Miles
eNB D, PN 3, 2.3 Miles
} 315

*Note eNB A not included in search results since it's outside of search radius

*Note eNB A not included in search results since it's outside of search radius

FIG. 4D

Create New Neighbor List for eNB X

Results
315 { eNB E, PN 4, 1 Mile
    eNB B, PN 2, 2 Miles
    eNB D, PN 3, 2.3 Miles

*Note eNB A not included in search results since it's outside of search radius

AUTOMATIC NEIGHBOR LIST GENERATION FOR LONG-TERM EVOLUTION (LTE)

TECHNICAL FIELD

Techniques and equipment are described for developing a list of neighboring cells for a base station (e.g., eNodeB) of a Long-Term Evolution (LTE) type mobile communication network.

BACKGROUND

In recent years, mobile communication services have expanded and increased in popularity, around the world. Mobile stations and networks were originally developed and deployed for voice telephone type communications and then for communication of relatively short text messages. However, as broadband multimedia services have evolved and expanded, the demand for such services has included an ever-increasing demand for broadband communications in the mobile environment. To meet evolving demands, the service providers and their equipment vendors have developed and deployed a series of ever more sophisticated mobile networks and mobile stations. Many geographic areas are now served by network technologies considered as third generation (3G) or even fourth generation (4G) in terms of the wireless technology. In that regard, some of the more advanced carriers are now in early stages of deploying elements of a Long-Term Evolution (LTE) type mobile communication network.

In wireless cellular communication systems, such as Code Division Multiple Access (CDMA), Evolution-Data Optimized (EVDO) and other systems, each cell broadcasts information about its geographically adjacent cells or neighbor cells. Information about neighbor cells is used by user equipment (UE) and/or a network for UE handoff between cells or cell selection by or for a UE. In some wireless cellular communication systems (e.g., 3G and EVDO), the neighbor cell information is typically broadcast as a neighbor cell list to UEs for performing handoff operations. In such cases, the UEs typically maintain local copies of the latest received neighbor cells list, and make and report received signal strength measurements on the cells identified in the list of neighbor cells.

However, in the LTE type mobile communication network, a serving cell (or base station) does not provide the UE with the list of neighbor cells. Instead, the UE scans all possible neighbor cells having cell identifier information (e.g., Physical Cell Identity (PCI), Pseudo Noise (PN) code, or frequency value) and makes handoff analysis and requests on those detected. After measuring the received signal strength on the candidate neighbor cells, the UE reports the measurement results to the network for a potential handoff when the signal strength of the serving cell reaches a certain threshold value during a call connection to the network.

As mentioned earlier, the UE scans all possible cells with PCI. The scanning operation by the UE is not limited by its processing power. If the UE sees a cell with a particular PCI that the UE wants to handoff off a call session to, the UE asks the network to do so. In this case, if the network does not know about the cell with the PCI that the UE is requesting for handoff operation, because the cell is not a neighbor cell in the list of neighbor cells, then the UE will not be allowed to make the handoff and the call session will drop as a result. In addition, if the UE is not allowed to make the handoff because the network does not have resources to set up and the base station does not know about, the network just ignores the reported PCI measurements by the UE. In the case, where the UE detects received signals to compile a neighbor list (or a list of neighbor cells), the list of neighbor cells is often limited by the UE's processing capability and/or memory capacity of the equipment. Hence, in the existing LTE technique, making the neighbor list accurate and as short as possible is of primary importance. As a result, the existing technique sometimes leads to missing neighbor cells and thus leads to failed or degraded mobility, because occasionally neighbor cells that are not likely to be inserted into the list of neighbor cells will be needed for handoff operation by the UE.

In another approach in the existing wireless cellular communication systems, the list of neighbor cells is established by a network using a self-optimization technique which utilizes long term statistics of traffic data collected in the network under normal operation. Thus, the self-optimization technique requires a live network and a considerable amount of historical traffic data for performing statistical analysis and building a list of neighbor cells. That is, based on the statistical analysis of traffic data and handoff data in a "mature" network, the list of neighbor cells for a cell site is established by adding or removing candidate cells for the neighbor list. As a result, during an initial deployment stage of a wireless cellular communication network, such as a LTE type communication network, where a collection of historical traffic data is not often available in the beginning for statistical analysis, the existing techniques (e.g., self-optimization based or statistical analysis based techniques) for establishing a list of neighbor cells have become ineffective and often miss neighbor cells, thereby causing performance issues (e.g., failed or degraded mobility). Also, the list of neighbor cells can be established manually by operators based on Radio Frequency (RF) measurements, test driving and simulations, but this requires a considerable amount of time and operator efforts and can also lead to a missing neighbor cell issue.

Hence, a need exists for automatically establishing an accurate list of neighbor cells for a cell site in an early deployment stage of a LTE type mobile communication network, where a historical collection of traffic data is not available yet for statistical analysis and self-optimization based techniques.

SUMMARY

The teachings herein alleviate one or more of the above noted problems with establishing a list of neighbor cells in an early stage of a Long-Term Evolution (LTE) type mobile communication network. The present teachings provide a distance-based technique for automatically establishing the list of neighbor cells for a cell site (eNodeB or base station) on the LTE type mobile communication network.

As a result, a list of neighbor cells for a cell site in the LTE type mobile communication network can be automatically established even though a historical collection of traffic data is not available for performing statistical analysis and building the list of neighbor cells for the cell site. Also, all possible candidates for the neighbor cells for the cell site are automatically accounted for without labor-intensive operator efforts.

For example, a disclosed method establishes a list of neighbor cells for a cell site, based on distance (or geometric) information. Data regarding location of one base station of the LTE type mobile communication network for which the list of neighbor cells is to be developed and location of other base stations within a predetermined search distance are processed. Distances between the one base station and each respective one of the other base stations are determined. Based on at least in part the determined distances between the one base station and each respective one of the other base stations, identification data for the other base stations are ordered. The list of neighbor cells for the one base station is compiled to include the ordered identification data for the other base stations. The compiled list is transmitted to the one base station.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
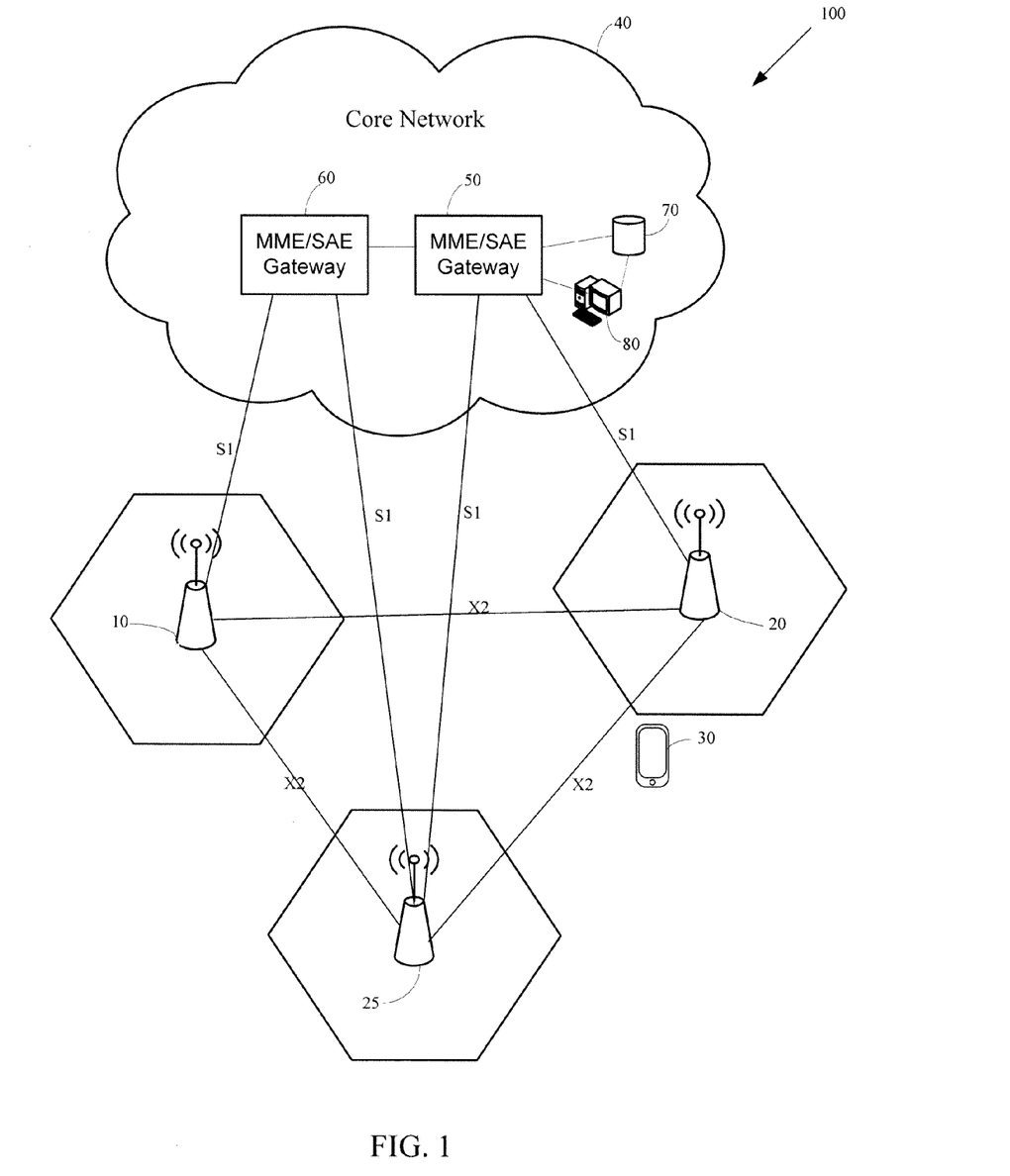
FIG. 1 is a simplified illustration of a LTE type wireless communication system including a system for developing a list of neighbor cells for a base station of the LTE network.

Reference now is made in detail to the examples illustrated in the accompanying drawings and discussed below. FIG. 1 illustrates an exemplary wireless communication system 100 of a LTE network. For illustration purposes, the drawing depicts three base stations (or eNodeBs) 10, 20, and 25 of the system 100, one user equipment (UE) 30, and a core network 40. However, it is appreciated that the wireless communication system 100 can include more than three base stations and serve many more than one UE. The UE 30 is any data device that communicates through a LTE type mobile communication network and is also known as a mobile device, a mobile station, or a subscriber station. The UE 30 communicates with one or more base stations 10, 20, and 25 by transmitting and receiving radio frequency signals carrying data packets over the wireless channel (or airlink) to and from one or more of the base stations 10, 20, and 25. The base station(s) serving the UE 30 in turn provides the interface for communications of the user's packet data via other network elements with other equipment, such as servers and other UE devices (not shown). The term "base station(s)" herein is a generic term for communication equipment at a cell site for enabling wireless communication for UEs operating within a service area of a cell. In LTE, for example, a base station is implemented as an evolved Node-B (eNodeB) which is an enhanced 3G base station. "Base stations" or "eNodeBs" in LTE provide the LTE air interface and radio resource management for the LTE type mobile communication network.

In FIG. 1, each base station (or eNodeB) 10, 20, or 25 has its own service area and provides cellular coverage for an omni-directional cell or a plurality of sectors, which is defined by an antenna configuration of the eNodeB. In the example, for the purpose of illustration, each cell is represented by a hexagon and its corresponding omni-directional base station (herein, the terms, "base station," "eNodeB," and "eNB," are used interchangeably). Typically, an omni-directional cell utilizes a single antenna; and a sectored cell utilizes a plurality of antennas, each sector of such a cell having its own service area. A directional base station serves a sectored cell. For example, a three-sectored base station includes three antenna groups, each antenna group consisting of one or more antennas.

The UE 30 communicates with an antenna, where the antenna transmits data to the UE 30 over the forward airlink and receives data from the UE 30 over the reverse airlink. The forward airlink (or downlink) refers to the communication link from any of the base stations 10, 20, and 25 to the UE 30, and the reverse airlink (or uplink) refers to the communication link from the UE 30 to any of the base stations 10, 20, and 25. In addition, each cell (or sector) has an identifying signature or cell identifier information (e.g., Physical Cell Identity (PCI), Pseudo Noise (PN) code, and/or frequency value) which the UEs use to identify cell and use as time and frequency references. These identifying signatures, for example, PCIs or PN codes, are not unique and may be reused within the wireless communication system 100. The base stations 10, 20, and 25 are connected to each other via X2 link interface for direct communication with each other.

The wireless communication system 100 also includes one or more Mobility Management Entity (MME)/System Architecture Evolution (SAE) gateway elements 50 and 60. As shown, the MME/SAE gateway elements 50 and 60 are collocated in a single entity, but they can be separate entities residing within the wireless communication system 100. The MME element performs and manages the signaling and control functions of thousands of user equipments, for example, among other functions, such as assignment of network resources and mobility management functions including paging, location tracking, and handoffs. The SAE gateway element provides other functions related to transporting Internet Protocol (IP) data packets carrying application specific data from/to other packet date network (not shown), such as the Internet, private IP network, or the like, to/from user equipment(s) 30 served by the base stations in the wireless communication system 100. The MME/SAE elements 50 and 60 are connected to each other and to individual or many base stations via S1 link interface for direct communication.

Also shown in FIG. 1 is a database 70 which is connected to the MME/SAE gateway element 50. The database 70 contains, among other information, information relating to location information (including physical or geometric location) of all base stations in the wireless communication system 100. A user at a computer 80 with input elements can perform various database operations to build, maintain, and use information stored in the database 70. There may be any number of computers having access to the database 70. The information or data in the database 70 can be updated from network configuration or via network planning tools. The database 70 can be built in a standard way via Structured Query Language (SQL) statements or file loading. For purposes of the present discussion, it is presumed that the computer 80 is used in building a list of neighbor cells for a cell site served by each base station in the wireless communication system 100.

As mentioned earlier, an area in which an antenna (or a group of antennas) is designed to communicate with various user equipments in a portion of a service area can be referred to as a "sector" of a cell. In the example, a cell (or a geographical area) is represented by a hexagon or circle. A "cell site," which provides cellular radio coverage to a cell, is a location or a point where the base station equipment and antenna(s) are located. In the example, a sector is defined as a sub-portion of an omni-directional cell, typically covering an angular cellular service area with its own physical cell identifier information.

Figure 2A:
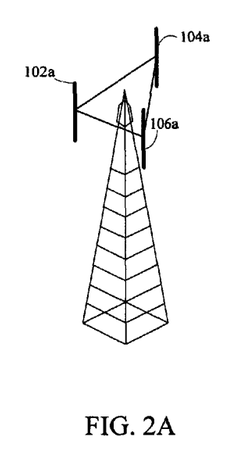
FIGS. 2A and 2B illustrate an exemplary antenna configuration of a base station having three sectors of a cellular service area.
Figure 2B:
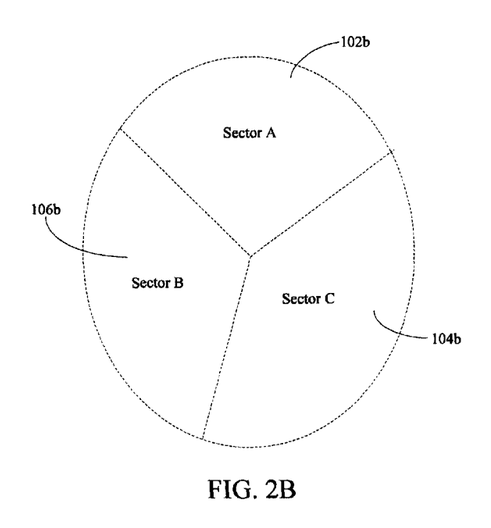

FIGS. 2A and 2B illustrate an example of a base station serving a three sectored cell via three antennas. In the example shown, an antenna 102a in FIG. 2A defines a coverage area corresponding to a sector A of service area 102b as in FIG. 2B; an antenna 104a in FIG. 2A defines a coverage area corresponding to a sector C of service area 104b as in FIG. 2B; and an antenna 106a in FIG. 2A defines a coverage area corresponding to a sector B of service area 106b as in FIG. 2B. In this configuration, each antenna 102a, 104a, or 106a is designed to communicate with numerous UEs in each respective sector 102b, 104b, or 106b of the cellular service area.

Referring back to FIG. 1, as the UE 30 moves away from the base station 20 towards other base stations, a handoff (or handover) may occur if the UE 30 receives a stronger signal (e.g., better signal-to-noise ratio measurements) from another base station, such as from the base station 10 or base station 25. Alternately, a handoff may occur if the current base station 20 cannot support a call from the UE 30 because of its bandwidth capacity and/or current traffic load. Based on a list of neighbor cells for the base station 20 that is currently serving the UE 30, the UE 30 continuously monitors signal strengths of the neighbor cells to determine which may become a candidate cell for later handoff. The UE 30 then generates a measurement report, which includes physical cell identifier information for identifying a candidate cell for handoff operation, and sends the measurement report to the base station 20 that is currently serving the UE 30. The measurement report may be generated and sent periodically.

Handoffs between the base station 20 and base station 10 or 25 can be handled by direct signaling between the base stations, and if the base station 20 determines that information contained in the measurement reports from the UE 30 are below or above a predetermined threshold, the base station 20 indicates to the UE 30 that a handoff is likely to occur and starts negotiating with a target base station 10 or 25 for handing off the call of the UE 30. Here, in the handoff operation, having an accurate list of neighbor cells for the cell site served by the base station 20 is important to providing seamless mobility to the UE 30 as the UE 30 moves away from the cell site served by the base station 20 towards another cell site served by other base station.

As mentioned earlier, in accordance with the present teachings, the list of neighbor cells for handoff operation is automatically established on the network based on distance information of all the cell sites (or base station/eNodeB locations) in the wireless communication system 100. As an implementation example, the technique for establishing the list of neighbor cells for one of the cell sites (or a particular base station) is now illustrated below in reference to FIG. 3 and FIGS. 4A-4F.

Figure 3:
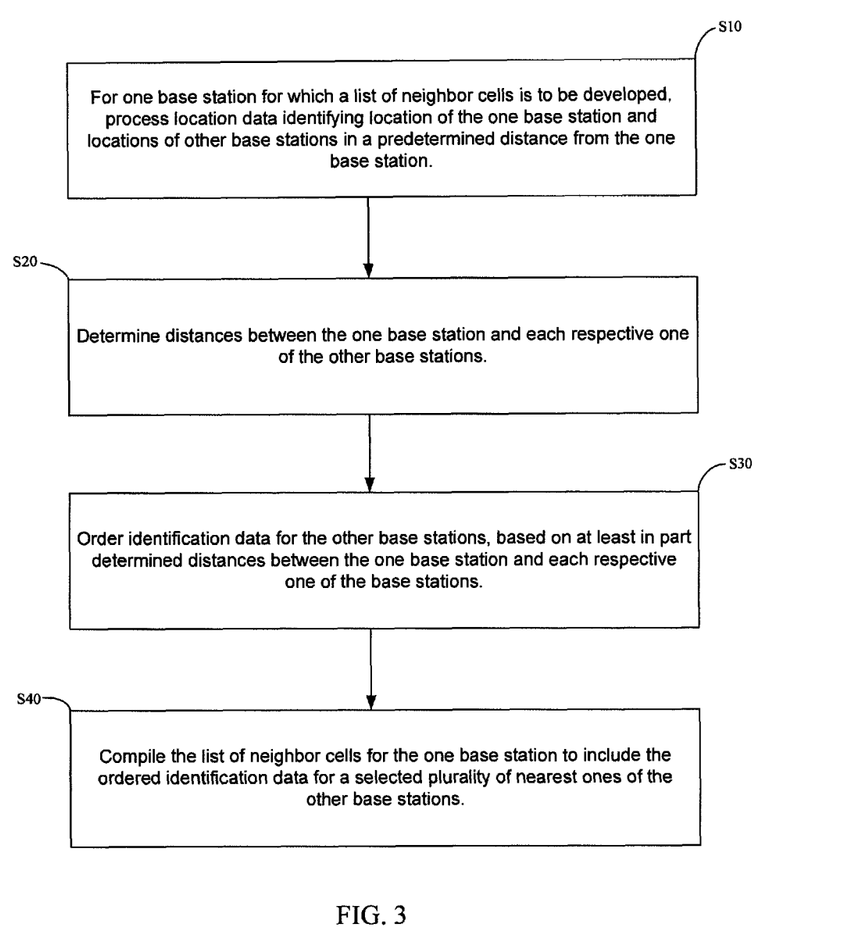
FIG. 3 illustrates a general flowchart for establishing a list of neighbor cells based on distance.

FIG. 3 is a simplified flowchart for illustrating how a list of neighbor cells for a base station is established on the LTE type mobile communication network 40 during its early stage of deployment where collection of traffic data of user equipments is not available for statistical analysis.

At S10, for one base station for which a list of neighbor cells is to be established, location data identifying location of the one base station and locations of other base stations within a predetermined distance from the one base station are processed. The location data can be received from the database 70 which is located within the LTE type mobile communication network 40, as shown in FIG. 1. The location data includes, among other information, physical location or geometric information (e.g., latitude and longitude coordinate values) of base stations or cell sites and various identification data including cell name, cell identifier information, etc.

At S20, physical distances between the one base station and each respective one of the other base stations are determined based on the location or geometric information.

At S30, based on at least in part the determined distances between the one base station and each respective one of the other base stations, the identification data for the other base stations are ordered or sorted. The identification data can be sorted by distance information in ascending order or descending order based on the geometric information associated with the other base stations. Alternatively, the sorting of the identification data can be performed by giving different weights to antenna azimuths of the other base stations. That is, if an antenna of a neighbor cell (or one of the other base station) points to the cell of the one base station for which the list of neighbor cells is being established, then a higher priority is assigned to the neighbor cell than the other neighbor cells (or the other base stations) whose antennas are not pointing toward the cell of the one base station.

At S40, the ordered identification data for nearest ones of the other base stations is compiled for the one base station, to form a list of candidate neighbor cells. Here, it is appreciated that the number of the nearest base stations in the list of candidate neighbor cells can be defined by the operator and is limited only by the network processing capability. Further, the candidate list may be parsed down to form an actual list of neighbor cells for the particular base station. For example, in compiling the list of neighbor cells for the one base station, any of the nearest base stations having the same cell identifier information as the one base station is removed from the list of neighbor cells for the one base station. Furthermore, if the candidate list of the nearest base stations includes two or more of the nearest base stations having the same cell identifier information, then only the nearest base station using the same cell identifier information but having the shortest distance from the one base station is kept and any other base stations using the same cell identifier information are removed from the candidate list of neighbor cells for the one base station. After the list of neighbor cells for the one base station is compiled, the list of neighbor cells is sent to the one base station for loading or updating the list of neighbor cells for use at that base station. Following the techniques outlined above, a network operator, without using statistical analysis or optimization techniques, can build lists of neighbor cells for base stations in the deployment stage of the LTE type mobile communication network.

Another simplified illustration of the above distance based technique for building a list of neighbor cells for a base station is illustrated in FIGS. 4A-4F. For the purposes of conceptual illustration, it is presumed that each base station serves an omni-directional cell using a single antenna. It is also presumed that in the example, PN codes are used as cell identifier information for each cell site.

Figure 4A:
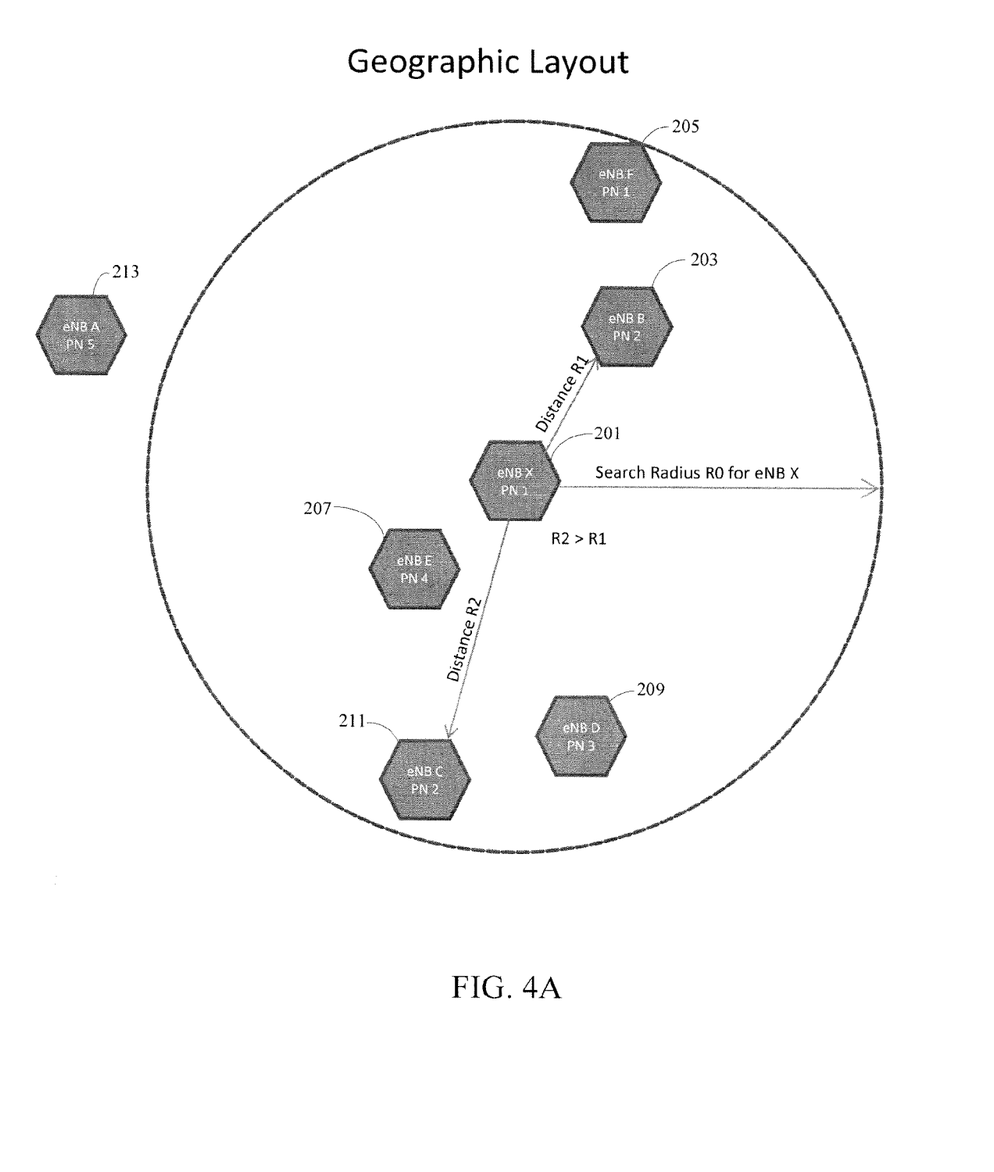
FIGS. 4A-4F illustrate an implementation in detail of establishing a list of neighbor cells based on distance.

As illustrated in FIG. 4A, a hypothetical geographical layout illustrates a number of base stations represented by eNodeBs at respective cell sites. As mentioned earlier, in LTE, the eNodeBs are communication equipment at a cell site for enabling wireless communication for UEs operating within a service area of a cell. The eNodeBs provide the LTE air interface and radio resource management for the LTE type mobile communication network.

In the example below, for the sake of discussion, each cell is represented by a hexagon with its respective cell site name, e.g., X, B, F, E, D, C, and A. Each eNodeB (or base station) at its cell site serves the respective omni-directional cell 201, 203, 205, 207, 209, 211, and 213, and is associated with a PN code for its cell identifier information. That is, the cell 201 is served by an eNodeB at X (labeled "eNB X") with PN 1; the cell 203 is served by an eNodeB at B (labeled "eNB B") with PN 2; the cell 205 is served by an eNodeB at F (labeled "eNB F") with PN 1; the cell 207 is served by an eNodeB at E (labeled "eNB E") with PN 4; the cell 209 is served by an eNodeB at D (labeled "eNB D") with PN 3; the cell 211 is served by an eNodeB at C (labeled "eNB C") with PN 2; and the cell 213 is served by an eNodeB at A (labeled "eNB A") with PN 5. In this example, the eNB X is selected as the one base station for which a list of neighbor cells is to be established for UEs served from the eNB X within its respective cellular coverage or service area 201. In the discussion below, the eNB X is illustrated as an omni-directional base station using a single antenna, but it can be a directional base station using multiple antennas.

For the purpose of illustration, in the example, R0 is a predetermined search distance (e.g., a search radius distance) from the eNB X for searching the database for other eNodeBs; and R1 is a distance between the eNB X and eNB B; and R2 is a distance between the eNB X and eNB C. The predetermined search distance can be set or inputted manually or automatically, e.g., by system parameters or scripts. As shown, it is noted that a plurality of eNodeBs, e.g., eNB B, eNB F, eNB E, eNB C, and eNB D, are located within the predetermined search distance R0 from the eNB X, but eNB A is located outside the predetermined search distance R0.

Figure 4B:
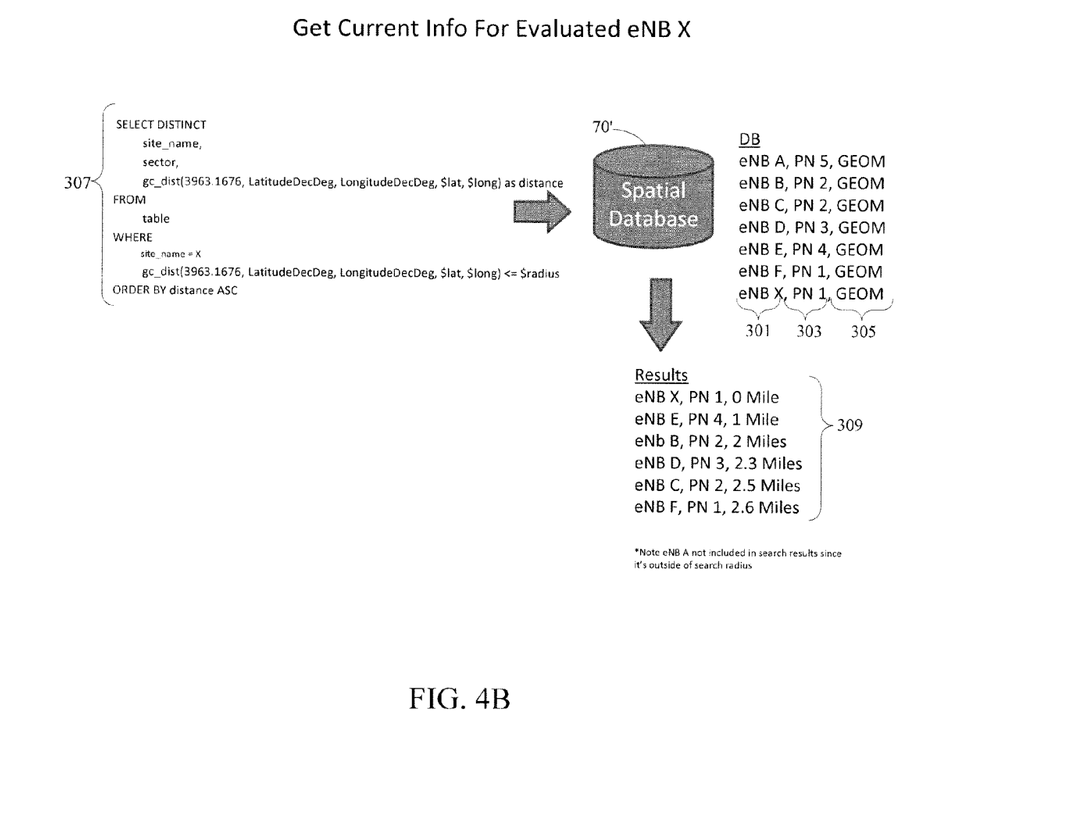

FIG. 4B illustrates how an initial list of neighbor cell candidates are obtained from a spatial database 70', for building the list of neighbor cells based on distance information. The spatial database 70' is an exemplary database containing various tables of date relating to cell sites in the wireless communication system 100, for example, among other information, cell site names, associated cell identifier information, and geometric data for each cell site. The spatial database 70' is built and/or updated either manually or automatically, e.g., by scripts and can be part of the LTE type mobile communication or alternately it can be located outside the network. The geometric data for each cell site includes latitude and longitude coordinate values in geographic coordinate system for each eNodeB. The spatial database 70' can be any database, such as Oracle, MySQL, Microsoft SQL Server, IBM Informix, PostGIS, PostgreSQL, or the like.

In the example, the data contained in the spatial database 70' includes cell site names 301 (e.g., eNB A-eNB X), associated cell identifier information 303 (e.g., PN1-PN5), and associated geometric data 305 (e.g., GEOM) for each cell site location. Also, the spatial database 70' supports various database languages including query languages, such as Structured Query Language (SQL) for various database operations (e.g., data insert, query, updates and delete, etc.). SQL is a database computer language designed for managing data in relational database management systems.

An exemplary SQL scripting for searching other cell sites within a search distance from a selected cell site, for illustrative purposes, is shown at 307 in FIG. 4B. In the example, the SQL scripts at 307 will query the table(s) of data in the spatial database 70' so that the query returns a list of cell sites within a predetermined search distance R0 from the eNB X, with the results sorted in ascending order by distance information from the selected cell site. Alternately, the results can be sorted in descending order by the distance information from the selected cell site. As shown at 309, the query results are shown in three columns—cell site name, PN code, and distance—sorted in ascending order by distance information. At 309, the eNB A is not included in the query results because it is located outside the search area covered by the search distance R0, as seen in FIG. 4A. The search distance can be set and inputted by an operator or can be set or inputted automatically via scripts.

PN codes and other cell identifier information are limited network resources and therefore are often re-used by different base stations in the network, typically, where the eNodeBs are separated by a distance greater than a certain threshold distance (hereinafter, the certain threshold distance is referred to as a "distance range" or "reuse distance"). The reuse distance corresponds to a distance between reuse of identification data, such as cell identifier information (e.g., PCI, PN code, frequency value) for eNodeBs. In the example, the threshold distance is the closest distance between eNodeBs using the same identification data, for example, the same PN code, and can be determined based on system capacity (e.g., the number of UEs to be supported in a service area). That is, in a metropolitan area with heavy data traffic, the reuse distance can be a short distance because of the large number of eNodeBs deployed close to each other to support a number of UEs, compared to that in a rural area with sparse data traffic. In most cases, the reuse distance will be sufficient that a UE device served by an eNodeB using a PN code will be out of range of the next nearest eNodeB using the same PN code. However, this may not always be the case; a fact that can be ascertained using the spatial database 70' which includes cell identifier information 303 (e.g., PN1-PN5) and associated geometric data 305 (e.g., GEOM) for many and perhaps all eNodeBs of a particular carrier's LTE type mobile communication network. As a result, a distance based search, as described above, may produce some results for candidate eNodeBs that use the same PN code as each other or use the PN code that is used by the one eNodeB for which a list of neighbor cells is being compiled. The former case may be especially relevant as eNodeBs that share the same PN code and are sufficiently separated from each other such that they are not directly within the threshold distance of each other may be within the search distance to be considered for handoff by an intermediary eNodeB.

Figure 4C:
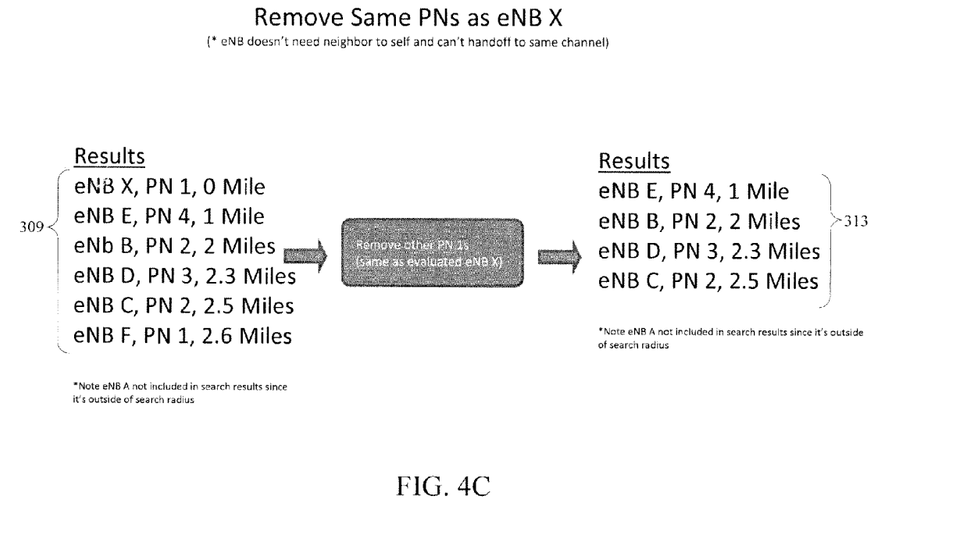
Figure 4D:
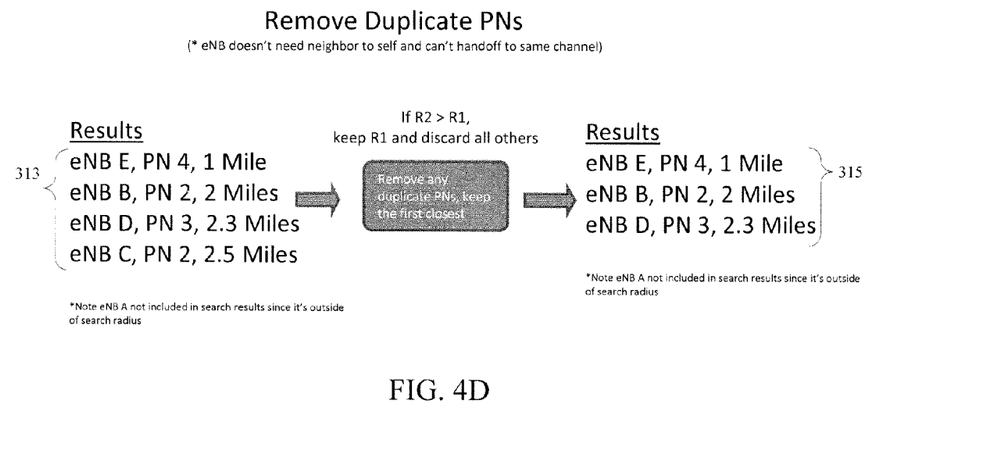

FIGS. 4C and 4D illustrate steps for removing cell sites served by eNodeBs with duplicate cell identifier information (e.g., PN Code) in compiling the list of neighbor cells for the eNB X.

FIG. 4C illustrates removing any cell site with the same PN code as the cell site (e.g., eNB X), for which a list of neighbor cells is to be established, from the list of neighbor cells. A cell with the same PN code means that an eNodeB at the cell site uses the same cell identifier as an eNodeB to which a UE is connected and thus the UE cannot handoff during an active call connection to the network (i.e., the user equipment can only handoff to a different radio frequency channel). As a result, any cell site with the same PN code as the cell site X (e.g., eNB X) is removed from the list of neighbor cells for the cell site X. In the example of FIG. 4C, at 309, the eNB F and eNB X have the same PN code (e.g., PN 1). Thus, information relating to the eNB F is removed from the list of neighbor cells for the eNB X; and information relating to the eNB X is also removed from the list of neighbor cells for the eNB X. An updated list of neighbor cells for the eNB X is shown at 313 in FIG. 4C.

Further, as illustrated in FIG. 4D, the list of neighbor cells can be streamlined by removing cell sites with duplicate cell identifier information. Alternately, it is noted that the steps in FIG. 4D can be performed before the steps in FIG. 4C. In the illustrated example, among eNodeBs with duplicate PN codes, the eNodeBs with greater distance from the eNB X are removed from the list of neighbor cells for the eNB X. That is, in FIG. 4D, at 313, two eNodeBs (e.g., eNB B and eNB C) have the same PN code (e.g., PN 2), but they are located at different distances away from the eNB X; for example, the eNB B is located 2 miles away from the eNB X (e.g. R1=2), and the eNB C is located 2.5 miles away from the eNB X (e.g., R2=2.5). In this case, the more remotely located (or distant) cell site (e.g., eNB C) is removed from the list of neighbor cells for the eNB X and the other cell site (e.g., eNB B) is kept in the list. In other words, between two cell sites with the same cell identifier information, a cell site with shorter distance is kept in the list of neighbor cells and the other cell sites is discarded. As a result, as shown in FIG. 4D, at 315, the list of neighbor cells is shortened to include only cell sites with distinct PN codes, sorted in ascending order by distance information.

Figure 4E:
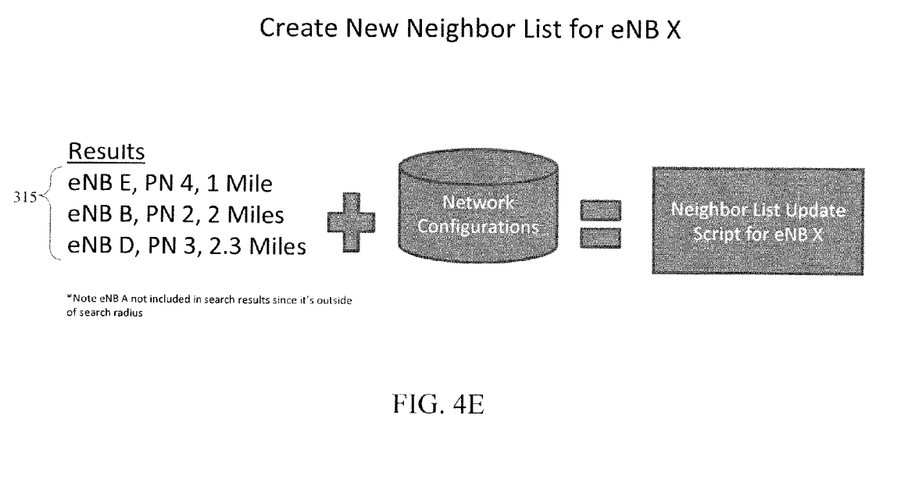
Figure 4F:
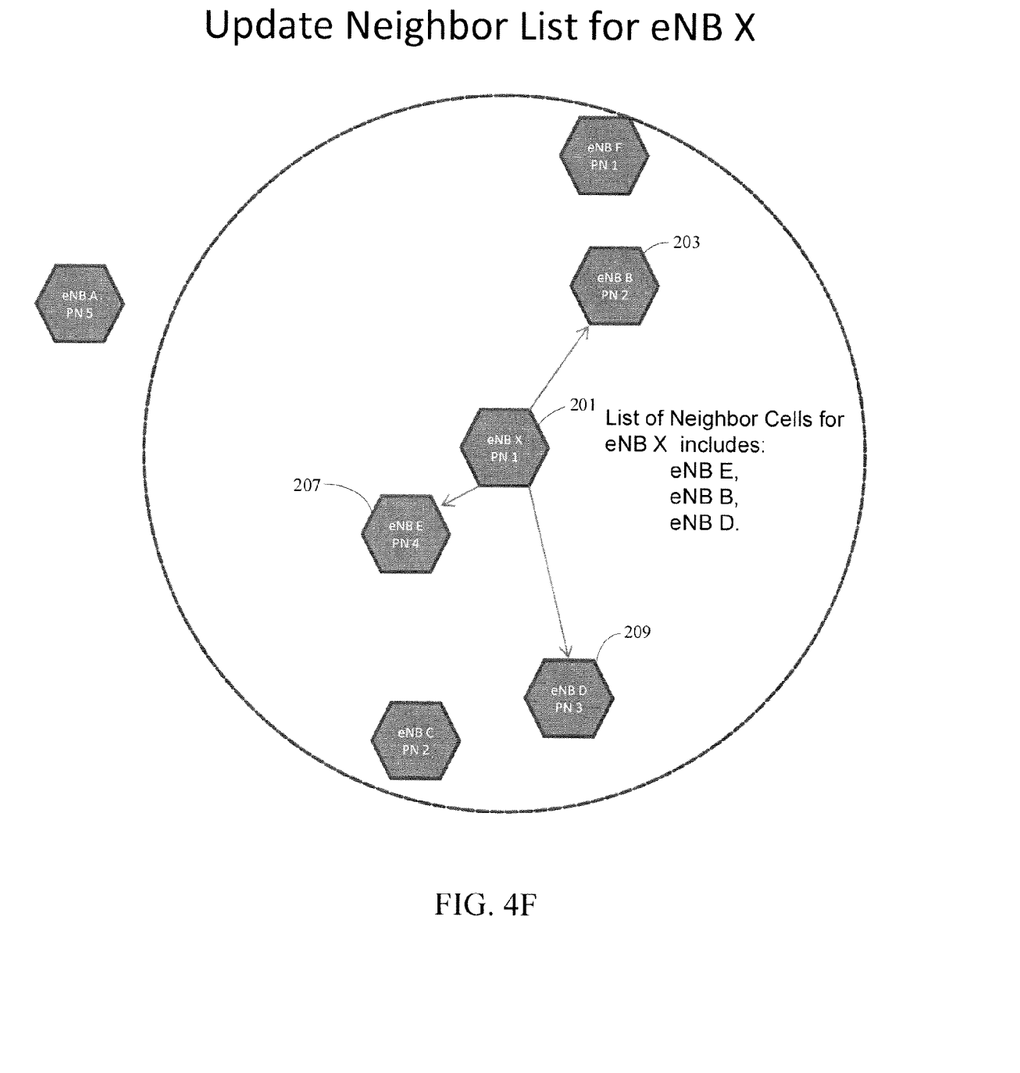

FIGS. 4E and 4F illustrate how the list of neighbor cells is updated for the eNB X. In FIG. 4E, the list of neighbor cells compiled in FIGS. 4A-4D is prepared as a script for updating the list of neighbor cells in the eNB X. As illustrated, network configuration parameters (e.g., IP address, etc.) are added to or combined with the list of neighbor cells to form a script for updating the list of neighbor cells in the eNB X. After the downloading or updating the list of neighbor cells, the eNB X has the updated list of neighbor cells, based on the distance information, for handoff operations of user equipment(s) in its service area. That is, as shown in FIG. 4F, the user equipment(s) in the cell 201 served by the eNB X can now handoff, as commanded by the network, to any of the neighbor cells 203, 207, and 209 (e.g., any of the cell sites served by eNB E, eNB B, and eNB D).

As mentioned earlier, the techniques and/or methods above relate to establishing a list of neighbor cells for an omni-directional cell served by an eNodeB (an omni-directional eNodeB or base station). However, it is also appreciated by one of ordinary skill in the art that similar techniques and/or methods can be used for establishing a list of neighbor cells for a directional cell served by the eNodeB (a directional eNodeB or base station).

Figure 5A:
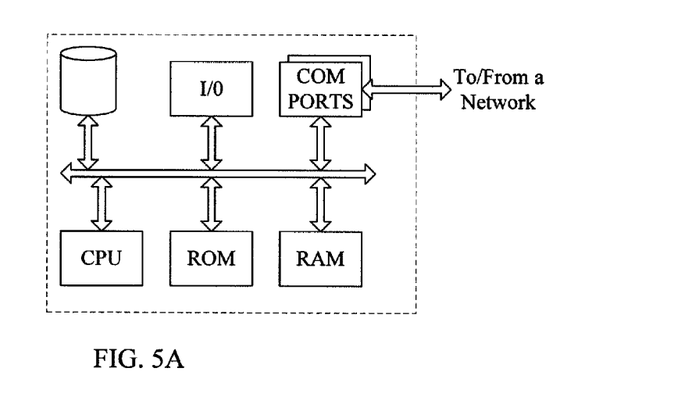
FIGS. 5A and 5B are simplified functional block diagrams of computer platforms that can implement the technique and/or method for establishing a list of neighbor cells based on distance information.
Figure 5B:
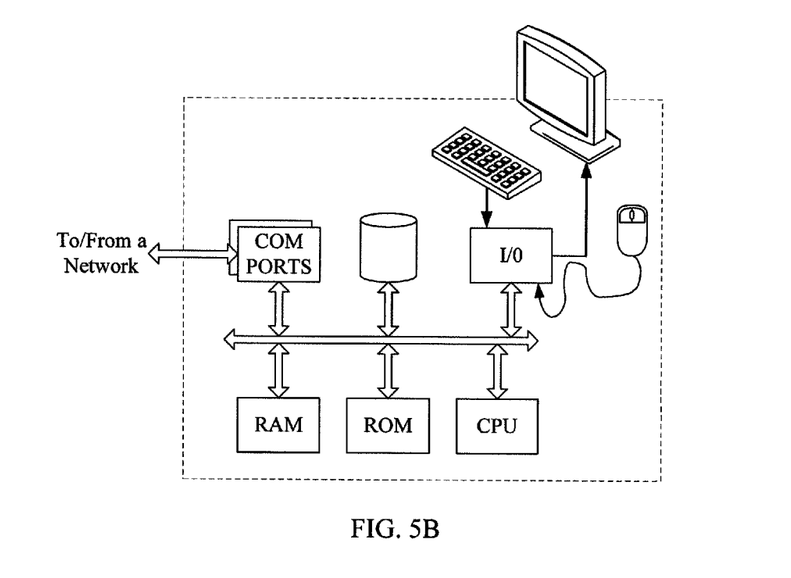

The techniques and/or methods for establishing a list of neighbor cells can be embodied in an appropriately configured computer or other data processing device such as the computer 80 as in FIG. 1. FIGS. 5A and 5B provide functional block diagram illustrations of such an appropriately configured computer or other data processing device, including the computer 80, that can implement the techniques and/or methods for establishing the list of neighbor cells. FIG. 5A illustrates a network or server type computer, as may typically be used to implement a server type computer that implements the technique and/or methods for establishing the list of neighbor cells. FIG. 5B depicts a computer with user interface elements, as may be used to implement a personal computer or other type of work station or terminal device, although the computer of FIG. 5B may also act as a server type computer if appropriately programmed. It is believed that those skilled in the art are familiar with the structure, programming and general operation of such computer equipment and as a result the drawings should be self-explanatory.

A server type computer, for example, includes a data communication interface for packet data communication. The server type computer also includes a central processing unit (CPU), in the form of one or more processors, for executing program instructions. The server type computer typically includes an internal communication bus, program storage and data storage for various data files to be processed and/or communicated by the server, although the server type computer often receives programming and data via network communications. Of course, the server functions may be implemented in a distributed fashion on a number of similar platforms or computers, to distribute the processing load. The hardware elements, operating systems, and programming languages of such server type computers are conventional in nature, and it is presumed that those skilled in the art are adequately familiar therewith.

A computer type user terminal device, such as a personal computer (PC) or tablet computer, similarly includes a data communication interface central processing unit (CPU), main memory, and one or more mass storage devices for storing user data and various executable programs. A mobile device may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Aspects of the methods of establishing a list of neighbor cells for a cell site (or base station) of the LTE type mobile communication network outlined above may be embodied in programming. Program aspects of the technology may be thought of as "products" or "articles of manufacture" typically in the form of executable code and/or associated data that is carried on or embodied in a type of machine readable medium. Storage type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the network into the computer platform of a terminal device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement establishing a list of neighbor cells of a cell site (or base station) in the LTE mobile communication network, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The term "exemplary" is used herein to mean serving as an example, instance, or illustration. Any aspect or design described herein as "exemplary" is not necessarily to be construed as preferred or advantageous over other aspects or designs. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of developing a list of neighbor cells for a base station of a mobile communication network, via a computer, comprising steps of:

processing location data identifying location of one base station of the mobile communication network for which the list of neighbor cells is to be developed and locations of other base stations of the mobile communication network within a predetermined distance from the one base station, to determine distance between the one base station and each respective one of the other base stations, wherein data is received from a database including identification data and the location data in a Long-Term Evolution (LTE) type mobile communication network under a situation in which collection of traffic data of different user equipment in the LTE type mobile communication network is not able to be accomplished;

ordering the identification data for the other base stations based on the determined distances between the one base station and the other base stations; and compiling the list of neighbor cells for the one base station for a selected plurality of nearest ones of the other base stations, from the ordered identification data.

2. The method of claim 1, further comprising transmitting the compiled list to the one base station.

3. The method of claim 1, wherein the identification data includes at least one of: physical cell identity (PCI), pseudo noise (PN) code, and frequency value.

4. The method of claim 3, wherein the compiling step comprises removing from the list of neighbor cells at least one of the other base stations having the same identification data as the one base station.

5. The method of claim 3, wherein the compiling step comprises, between two other base stations having the same identification data, removing from the list of neighbor cells one of the two other base stations based on the determined distance.

6. The method of claim 1, wherein the other base stations of the selected plurality are all of the nearest other base stations of the mobile communication network within a reuse distance of the one base station, wherein the reuse distance corresponds to a distance between reuse of the identification data in the mobile communication network.

7. The method of claim 1, wherein the ordering step of the identification data is based on at least in part antenna azimuth information of the other base stations.

8. The method of claim 1, wherein the one base station is an omni-directional base station.

9. The method of claim 1, wherein the one base station is a directional base station.

10. The method of claim 1, including,
ordering the identification data for the other base stations in ascending or descending order based on the determined distances between the one base station and the other base stations.

11. A computer, comprising:
an interface for network communication;
a processor coupled to the interface;
a program for the processor; and
storage for the program;
wherein execution of the program by the processor causes the computer to perform functions, including functions to:
process location data identifying location of one base station of a mobile communication network for which a list of neighbor cells is to be developed and locations of other base stations of the mobile communication network within a predetermined distance from the one base station, to determine distance between the one base station and each respective one of the other base stations,
wherein the execution of the program by the processor further causes the computer to perform a function to receive data from a database including the identification data and the location data in a Long-Term Evolution (LTE) type mobile communication network under a situation in which collection of traffic data of different user equipment in the LTE type mobile communication network is not able to be accomplished;
order the identification data for the other base stations based on the determined distances between the one base station and the other base stations;
compile the list of neighbor cells for the one base station for a selected plurality of nearest ones of the other base stations, the list including the ordered identification data; and
transmit the compiled list of neighbor cells to the one base station.

12. The computer of claim 11, wherein the identification data includes at least one of: physical cell identity (PCI); pseudo noise (PN) code, and frequency value.

13. The computer of claim 12, wherein the execution of the program by the processor further causes the computer to perform a function to remove from the list of neighbor cells at least one of the other base stations having the same identification data as the one base station.

14. The computer of claim 12, wherein the execution of the program by the processor further causes the computer to perform a function to, between two other base stations having the same identification data, remove from the list of neighbor cells one of the two other base stations based on the determined distance.

15. The computer of claim 11, wherein the other base stations of the selected plurality are all of the nearest other base stations of the mobile communication network within a reuse distance of the one base station, wherein the reuse distance corresponds to a distance between reuse of the identification data in the mobile communication network.

16. The computer of claim 11, wherein the execution of the program by the processor further causes the computer to perform a function to order the identification data for the other base stations, based on at least in part antenna azimuth information of the other base stations.

17. The computer of claim 11, wherein the one base station is an omni-directional base station.

18. The computer of claim 11, wherein the one base station is a directional base station.

19. The computer of claim 11,
wherein execution of the program by the processor causes the computer to perform ordering of the identification data for the other base stations in ascending or descending order based on the determined distances between the one base station and the other base stations.

* * * * *